H. T. GOSS AND J. W. BRYCE.
RECORDER.
APPLICATION FILED MAY 8, 1919.

1,348,217.

Patented Aug. 3, 1920.
7 SHEETS—SHEET 1.

Fig.1.

H. T. GOSS AND J. W. BRYCE.
RECORDER.
APPLICATION FILED MAY 8, 1919.

1,348,217.

Patented Aug. 3, 1920.
7 SHEETS—SHEET 2.

Fig. 2.

INVENTOR
Harry T. Goss
James W. Bryce
BY
Kerr, Page, Cooper & Hayward
ATTORNEY

H. T. GOSS AND J. W. BRYCE.
RECORDER.
APPLICATION FILED MAY 8, 1919.

1,348,217.

Patented Aug. 3, 1920.
7 SHEETS—SHEET 4.

H. T. GOSS AND J. W. BRYCE.
RECORDER.
APPLICATION FILED MAY 8, 1919.

1,348,217.

Patented Aug. 3, 1920.
7 SHEETS—SHEET 6.

H. T. GOSS AND J. W. BRYCE.
RECORDER.
APPLICATION FILED MAY 8, 1919.

1,348,217.

Patented Aug. 3, 1920.
7 SHEETS—SHEET 7.

INVENTOR
Harry T. Goss
James W. Bryce
BY
Kerr, Page, Cooper & Hayward
ATTORNEY

UNITED STATES PATENT OFFICE.

HARRY T. GOSS, OF RUTHERFORD, NEW JERSEY, AND JAMES W. BRYCE, OF BINGHAMTON, NEW YORK.

RECORDER.

1,348,217.  Specification of Letters Patent.  Patented Aug. 3, 1920.

Application filed May 8, 1919. Serial No. 295,764.

*To all whom it may concern:*

Be it known that we, HARRY T. Goss and JAMES W. BRYCE, residing at Rutherford, Bergen county, State of New Jersey, and Binghamton, Broome county, State of New York, respectively, have invented certain new and useful Improvements in Recorders, of which the following is a full, clear, and exact description.

In a patent granted on November 5, 1912, No. 1,043,094, on an application filed by us, we have shown and described a time recorder of a type now well known in this art, and the invention which forms the subject of the present application is an improvement on the device set forth in that patent.

In general terms, the present improvement is designed to prevent the misuse by workmen of a time recording device, and comprises means whereby each individual workman, whenever he registers his time, no matter when, will always print the time record on a different part of the record sheet. Thus when a workman arrives in the morning his record is made in his morning "in" space on the sheet. The next time he registers, even if immediately after the first, the imprint will be made in another space—usually considered the morning or noon "out" space, and so on through the day. On the other hand, another workman, who arrives even after the second registration of one who preceded him, will register his time in the morning "in" space. The adjustment of the machine, in other words, is effected for and by each workman separately and not collectively, so that each time a registration is made the imprint will be in a clean or unprinted space on the record sheet, and hence no previously printed record can be obliterated or rendered illegible by repeated registrations of the machine.

There are two types of machine commonly employed for this purpose, one known as a dial machine in which the records are printed in the machine upon a record sheet, and the other a card machine in which the records are printed on cards which are retained by the workmen and turned in at stated intervals, usually once a week. The present application involves improvements on the first named or dial type, but contemporaneously with this application we are presenting a companion case which is based upon improvements of a broadly similar nature on the card type of machine.

In the accompanying drawings which illustrate our present invention in its most approved and practicable form—

As we are dealing with a machine the general plan of construction of which is well known in the art, a detailed description of its parts will not be necessary, but for purposes of the present case it need only be said that such machine has a fixed dial 1 with numbered holes 2 provided around and near its edge and a handle 3 pivoted to a frame 4 revolving about a central plunger 5. When a workman registers, he grasps the handle 3, turns it until the pin 6, in its end, comes opposite the hole which bears his name or number and then pushes the pin home in the hole and thereby prints his time at the appropriate point on a record sheet 7 carried by a cylinder 54 turning about a horizontal axis.

Figures 13, 14, 15:
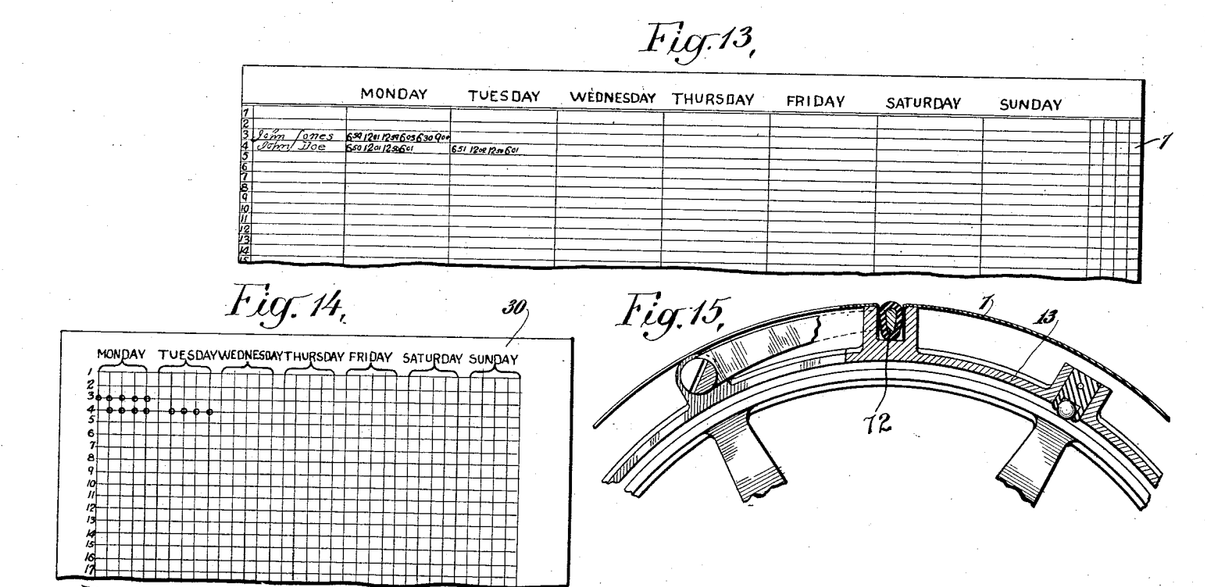
Fig. 13 shows a portion of the record sheet of a weekly dial machine of the kind herein contemplated.
Fig. 14 shows a portion of the finder control sheet which co-acts with the punching and finder mechanism to control the in and out positions of the printing carriage.
Fig. 15 is an enlarged detailed section of the record sheet holding device.

It may be assumed that the machine is a weekly dial time recorder, for which purpose the record sheet 7, Fig. 13, has seven divisional spaces for the days of the week, and the type wheel carriage 9 is advanced over the cylinder which carries the sheet by means of the clock mechanism 8 and other known means. In connection with the type wheels there is a time controlled mechanism by which they are set.

In this as in all machines of this kind, the clock mechanism 8 operates through suitable intermediate mechanism 40 to shift the time type wheels and printing mechanism 9 over the record cylinder through a space equal to one of the day columns or subdivisions on the record sheet once every twenty-four hours, so that the impressions for the several days of the week will be printed in their appropriate places on the sheet. In this case, however, there is used a cylinder 29, which carries a finder control sheet 30, Fig. 14, and it is essential that this cylinder be moved daily through spaces corresponding to those over which the record sheet cylinder is shifted. The same mechanism 40 performs this operation. If the type wheel carriage, for example, be set for Monday, or the first day of the week, the finder control sheet 30 must be in a corresponding position, with the five Monday columns or spaces under five punches 38 which are carried over it, and for each day shift of the type wheel carriage there will be a corresponding shift of the finder control sheet.

The cylinder 29 is moved longitudinally by the clock mechanism through the instrumentality of one of the gears 40′, which drives a belt 69, which is attached to a sliding standard 70, the upper end of which engages a groove in the bearing of the cylinder on a transverse shaft 71. The proper movement of rotation is imparted to the gear wheel 40 to effect the daily shifting of the cylinder 29.

The finder control sheet not only moves longitudinally in unison with the type wheel carriage, but it rotates synchronously with the record sheet. That is to say, when a workman turns the handle 3 to find the hole named or numbered as his, he revolves the shaft carrying the frame 4 and the record sheet cylinder. The finder control sheet cylinder is thereby rotated to the same relative extent by means of the gears 41 intermediate to the two shafts which carry the supporting cylinders.

In these machines also, when the handle 3 is pushed forward by the workman, it operates a printing device which makes an impression of the time type which have been set up above the record sheet, but all of the above described devices being old and well known to the art, and forming no part of the invention with which the present application is directly concerned, require no further description herein, and will be referred to only in so far as may be necessary for an understanding of the improvements involved in this application.

Figure 1:
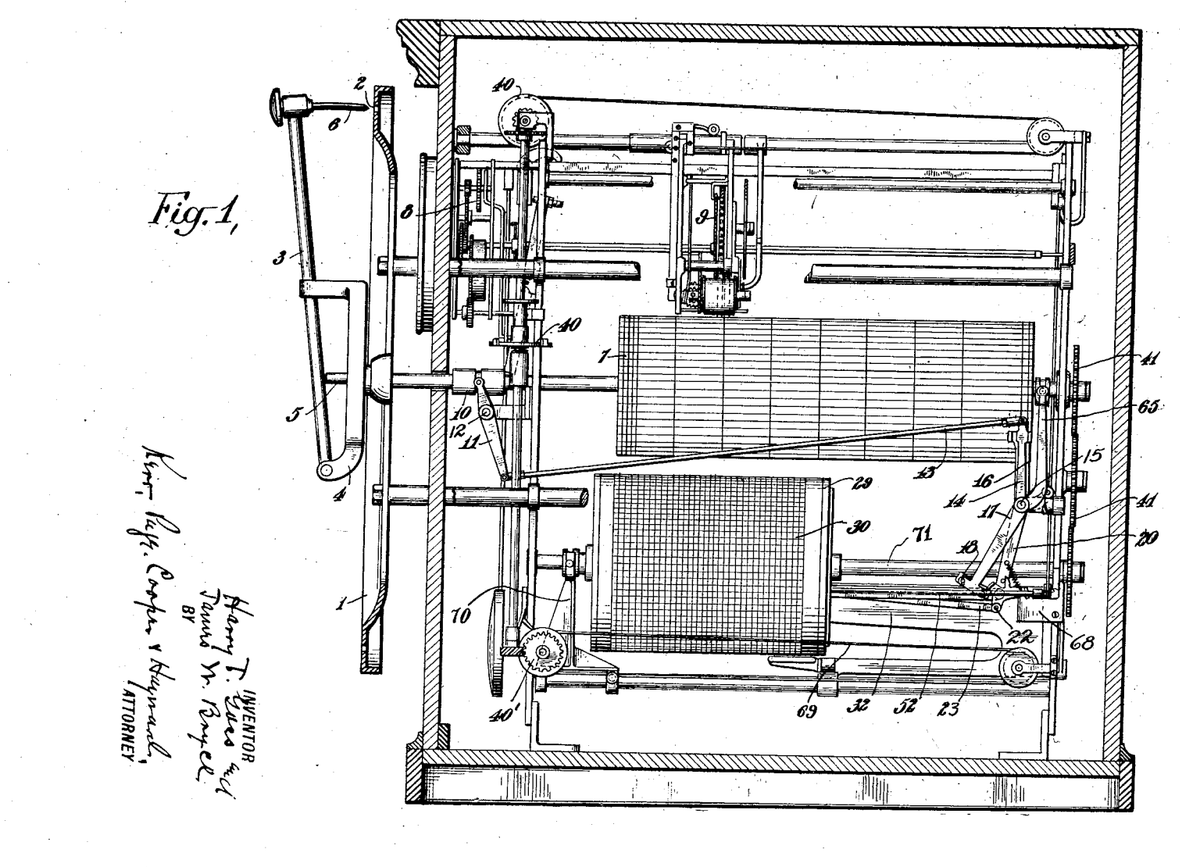
Figure 1 is a vertical sectional view of a weekly dial type of machine of well known construction, with which our improvements are incorporated.
Figure 2:
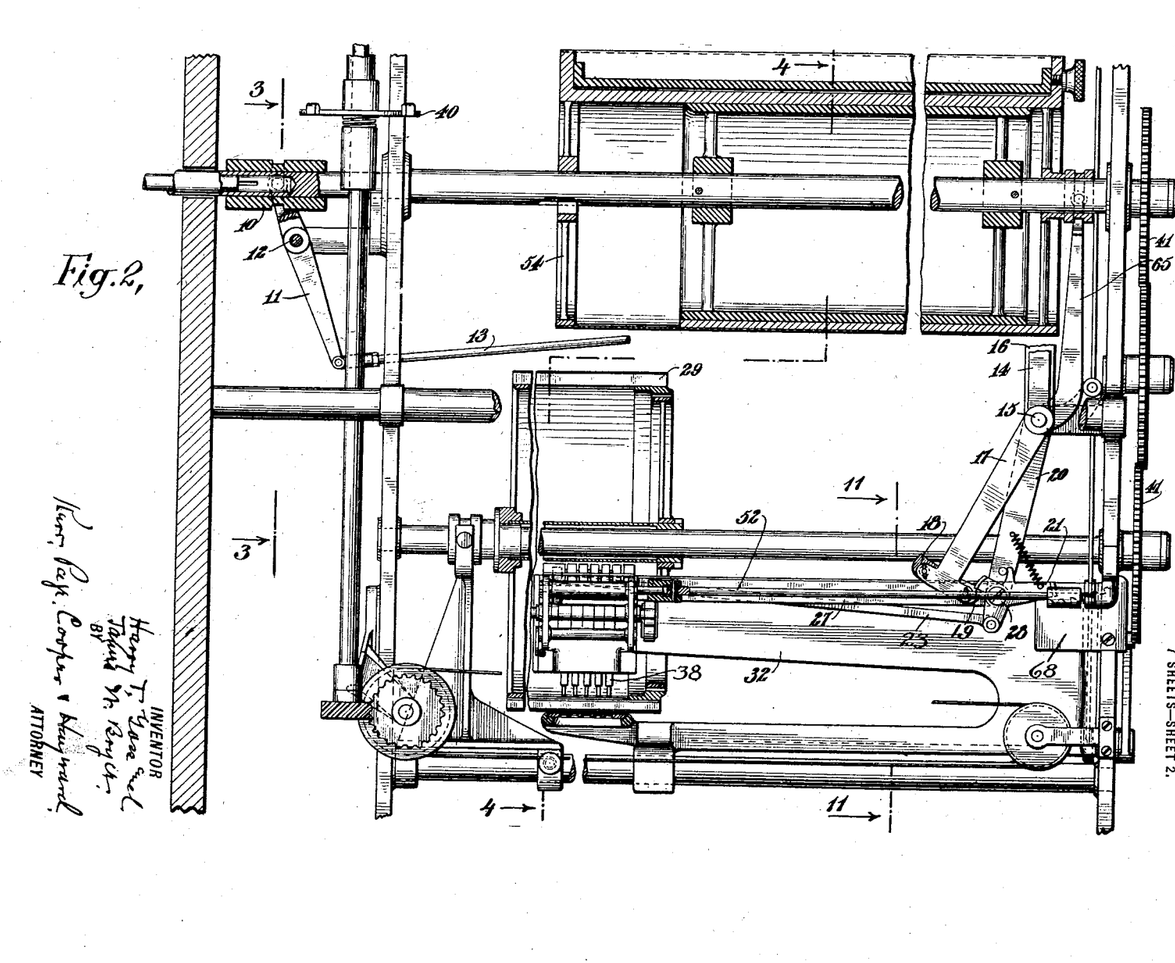
Fig. 2 is a detailed sectional view of the said apparatus in the same plane as Fig. 1, but omitting the clock and the printing carriage.
Figure 3:
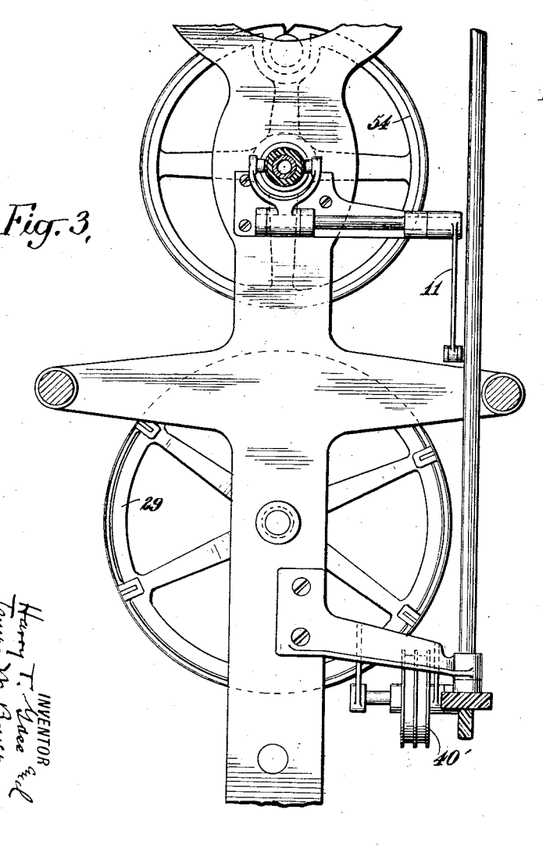
Fig. 3 is a vertical cross section on the line 3—3 of Fig. 2.

The improvements proper may be described largely by following the operations effected by their use, as in themselves they are in nearly all cases mechanisms of known character for performing their allotted functions. With this in mind, therefore, it may be stated that when a workman comes in on say Monday morning, he turns the handle 3 to bring the pin 6 over his particular hole 2 and pushes the handle and pin home therein. This forces in the plunger 5, which, as will be seen from Figs. 1, 2 and 12, moves to the right a sleeve 10 and thereby rocks a lever 11 pivoted at 12 and draws back a rod 13 connected to the free end of a lever 14 turning freely on a shaft 15 in stationary bearings in the frame of the machine.

On shaft 15 is fixed a lever 16 with two projections at its end that lie in the path of movement of the lever 14 and on opposite sides of the same, and which is moved by the said lever, provision being thus made for a certain amount of lost motion so that said lever 16 is not swung until the pin 6 has been forced nearly home in a perforation 2. To the shaft 15 is also fixed an arm or lever 17 carrying at its free end a plate 18 with a notch or tooth 19 therein. There is also a lever 20 mounted loosely on the shaft 15 which carries at its lower end a spring actuated pawl 21 which is engaged by the notch 19 when the lever 16 is turned to the right, or from the position shown in Fig. 2 to that shown in Fig. 12.

Figure 9:
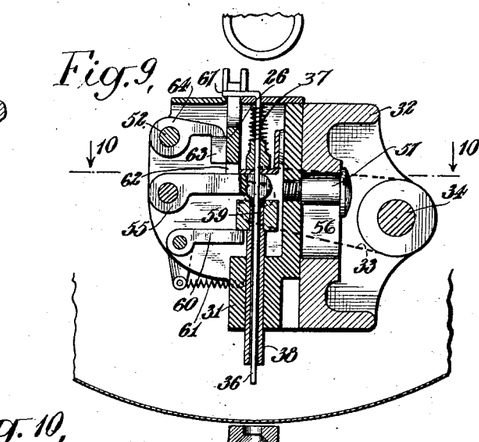
Fig. 9 is a cross section on the line 9—9 of Fig. 7.
Figure 10:
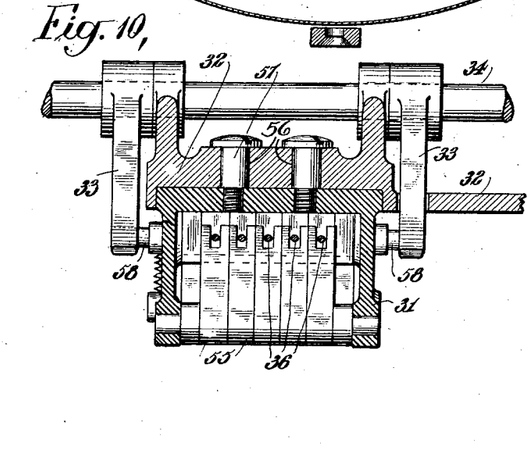
Fig. 10 is a horizontal section on the line 10—10 of Fig. 9.
Figures 11, 12:
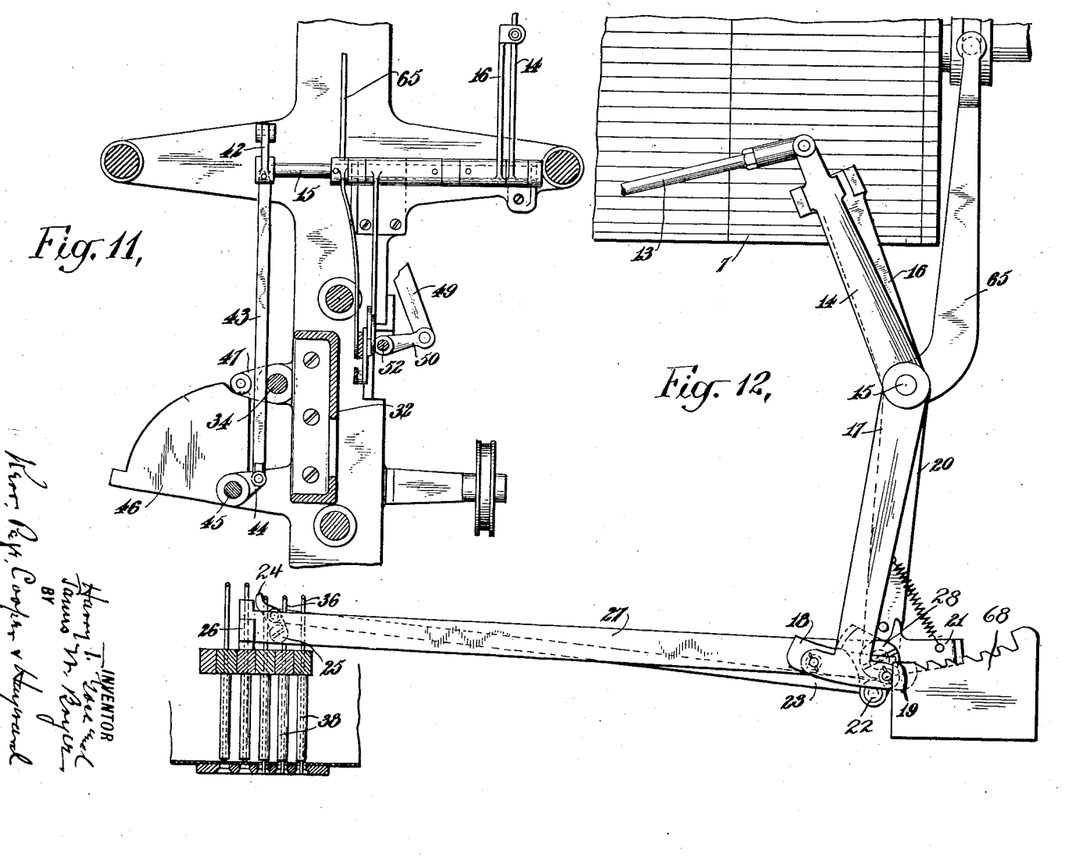
Fig. 11 is a vertical section on the line 11—11 of Fig. 2.
Fig. 12 is a detailed side elevation of certain parts of the finder mechanism.

The pawl 21 has a depending arm to which is pivoted at 22 a rod or bar 23 the other end of which is connected to a pawl 24 pivoted at 25 to a selector block 26 arranged over a series of five levers 55 mounted in a punch holder, Figs. 9 and 12, and which is supported within the cylinder 29 by means of a bracket 32 extending from the right hand side of the frame into said cylinder. The block 26 is fixed to or integral with an arm 27 which is pivotally mounted to swing about the center 28 upon which pawl 21 is mounted.

Figure 4:
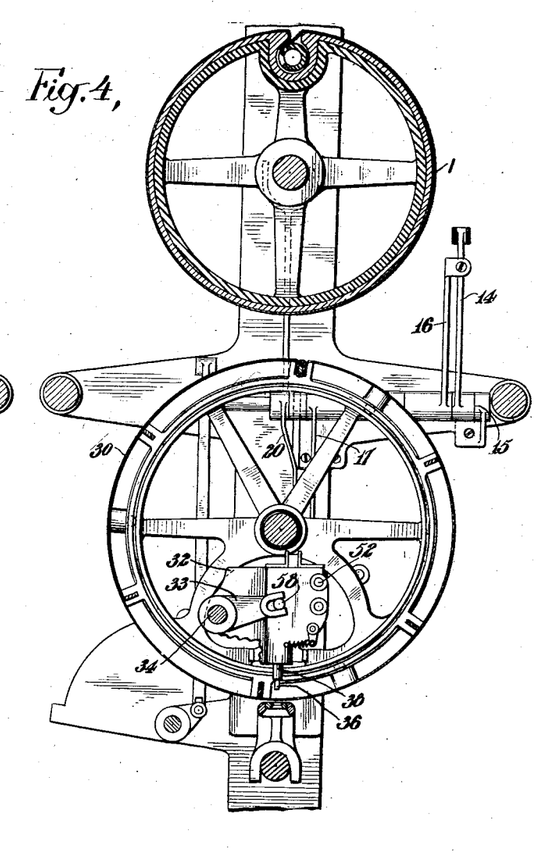
Fig. 4 is a vertical cross section on the line 4—4 of Fig. 2.
Figure 5:
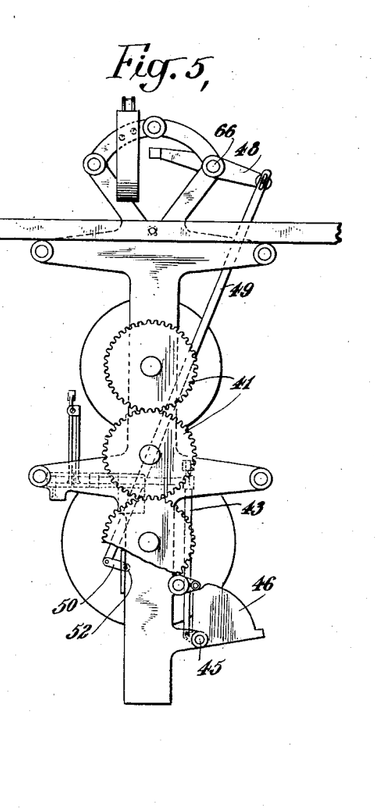
Fig. 5 is a rear view of the mechanism shown in Fig. 1.
Figure 6:
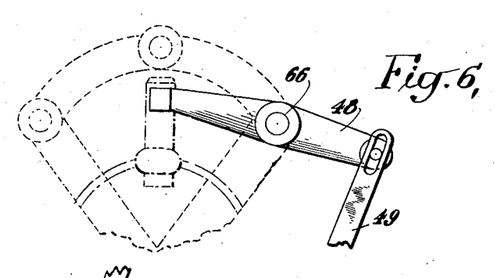
Fig. 6 is an enlarged view of certain of the parts or elements shown in Figs. 1 and 5.
Figure 7:
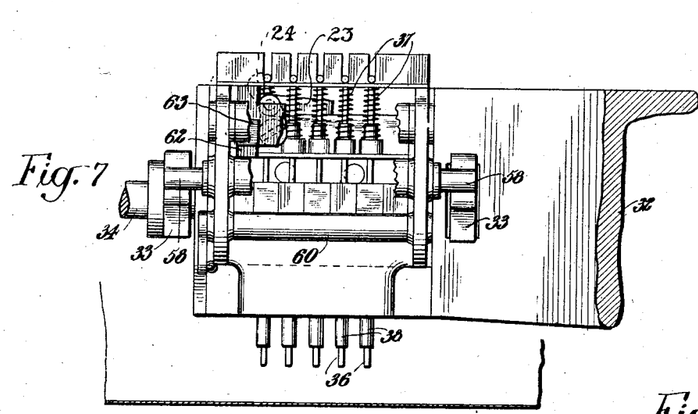
Fig. 7 is a side elevation of the punching and finder mechanism.
Figure 8:
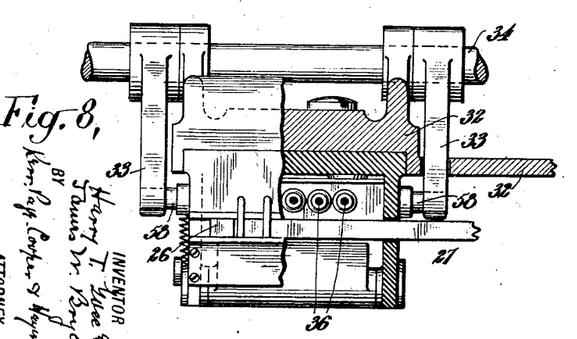
Fig. 8 is a plan view of the same parts.

The punch holder is shown in detail in Figs. 7 to 10. It comprises a frame 31 secured to the bracket 32 by means of screw bolts 57 which work in slots 56 in the bracket. A shaft 34 extends through the cylinder 29 and carries arms 33 which have bifurcated ends as shown in Fig. 4 which engage into pins 58 in the sides of the holder 31 so that when said shaft 34 is partially rotated the punch holder is depressed.

In the holder are five punches 38 having enlargements or heads 59 under which lies a pivoted plate 60 to which is connected a spring 61, and by this means the punches are normally held in an elevated position. Over each punch and having bifurcated ends are five levers 55 pivoted to the holder, and adapted when depressed to force down a punch.

As stated above, the selector block 26 is designed to slide over the five levers 55. This block, which forms a part of or is secured to the bar 27 has a toe 62 and a lug on one side 63 and in the upper part of the holder is pivoted a plate 64 which lies over the path of the selector block.

Returning now to the operation of the mechanism. When the lever 14 is pulled to the left the lever 16 is swung with it and thus swings the lever 17 to the right. The latter pushes with it the lever 20 by its engagement with the pawl 21, and this movement extends to the limit of all the levers in question. As lever 20 is shifted the bar 27 is drawn to the right which results in moving the selector block 26 over the levers 55 until it comes to rest over the last lever and punch of the group. By the same movement the upper half of lever 20 marked 65 in the drawings, and which engages by pins with a groove on an extension from the cylinder 54, moves the latter through the space of one day column, so that the left hand side of the column for the day is brought under the printing type wheels.

To the shaft 15 is fixed an arm 42 which connects by a link 43 with an arm 44 on a shaft 45, to which is fixed a cam plate 46, so that when the shaft 15 is rotated this cam swinging to the right in Fig. 11 raises a stud on an arm 47 fixed to the shaft 34 and turns the latter. By this movement of the shaft 34 the arms 33 swing downward and lower the punch holder 31 until the ends of the punches reach the surface of the finder control sheet on the cylinder 29.

Through each punch 38 extends a pin 36 movable freely through the punch and held down by a spiral spring 37. These pins meeting the surface of the sheet are forced back against these springs and perform no other function at this time.

When the parts have been brought to the position just described, it is desirable that an impression be taken from the type wheels, and for this purpose a shaft 66 is rocked by mechanism intermediate thereto and the handle 3, which is common in these machines. This construction is shown for example in patent to J. and A. Dey, No. 908,976, dated Jan. 5, 1909, and need not be specifically described; and this movement rocks an arm 48 fixed to shaft 66 which raises a link 49 and rocks an arm 50 on a shaft 52 to which is fixed the plate 64 which is thereby depressed and striking the lug 63 on the selector block forces the latter down on the last of the five punch controlling levers 55, and forces the punch under said lever through the paper at a point corresponding to the first Monday position in the sheet. On the release of the handle 3 by the workman all of the parts are restored to normal position, and two things will have been done. The man's "in" time will have been printed at the left hand side of the Monday space on the record sheet, and a hole will have been punched in a corresponding position on the finder control sheet.

Should the same workman, at any time thereafter, register again, he goes through the same manipulation of the handle 3 with the same resulting action of the parts described except for this—that when the pin 36 of the last punch to the right comes over the hole which by the previous operation has been punched in the finder sheet, it passes through such hole and draws down its bent over end 67 into the path of the pawl 24 on the selector block and thus checks the movement of the bar 23 with the result that the pawl 21 is swung down into engagement with a stationary rack 68 before the lever 20 has completed its possible movement to the right, and releases the pawl from engagement with the plate 18 on lever 17 which being thus freed keeps on until it has completed its full movement.

By this means the selector block 26 is arrested over the second punch lever from the right, and the cylinder 54 is moved one step less than its full amount, so that the impression will be made on the record sheet in a clean space, and a record hole will be punched by the next to the last punch of the series. From this it will be seen that by every subsequent registration by the same workman, the time will be printed in a clean space and a new hole one step advanced will be punched in the finder control sheet.

What is true of one workman is true of all, for each one not only prints his time in a different horizontal line on the record sheet but punches holes in a different horizontal line on the finder control sheet, so that no one can print twice in the same place on the sheet, or defraud the employer by printing his "in" or "out" time at any other part of the sheet than that intended to receive it.

In Fig. 15 a means for securing the record or finder control sheet to the cylinder is shown as consisting of a more or less elastic bar 72 adapted to be forced into a longitudinal groove in the cylinder over the edges of the sheet which enter said groove.

The means for stopping the record cylinder at different points so as to receive the impression on a clear part of the sheet and for punching the holes in successively advancing positions in the finder control sheet may be widely varied, and other suitable means for the purpose may be employed. We have, however, illustrated the most simple and effective mechanical arrangement of which we are aware.

This apparatus fills a great want in mechanism of this kind and may be applied to many forms of machine. By its use all tampering with or improper use of a time recorder on the part of dishonest workmen is effectually prevented, and but a very slight expense is involved in its application.

What we claim in our invention is:

1. In a time recorder the combination with the means for operating the same to print the time of registry by workmen, of a record sheet carrier for recording such impressions, and a finder control sheet carrier, the record sheet carrier being longitudinally movable, a row of punches over the finder control sheet, spring seated pins passing through the punches, means movable over the entire row of punches and adapted to normally operate the last one of the row, a connection between the same and the machine operating means for effecting such movement and that of the record sheet carrier, a stop carried by said punch operating means and a connection between the same and the intermediate moving mechanism adapted to encounter any punch pin which may pass through a previously punched perforation in the finder control sheet and to thereby disconnect the moving means and lock the punch operating means and the record sheet carrier at points determined by the pin which has passed through a hole.

2. In a time recorder the combination with the means for operating the same to print the time of registry by workmen, of a longitudinally movable record sheet carrier, a finder sheet carrier, a punch holder and row of punches over the same, means movable over the row of punches and adapted to operate any one of the same according to its position, means for imparting movement to the record sheet carrier and to the punch operating means, and means carried by the punch holder for passing through any perforation punched in the finder control sheet for arresting the movement of the punch operating means and disconnecting the movement imparting means from the same and also from the record sheet carrier.

3. In a time recorder comprising a longitudinally movable record sheet carrier, a finder sheet carrier and a row of punches over the finder sheet, the combination with the means for operating the same to print the time of registering by workmen, of a means engaged and operated thereby for imparting to the record sheet carrier its movement, a punch operating means also moved over the punches thereby, and means adapted to be operated by a hole punched in the finder control sheet for arresting the latter and disconnecting the movement imparting means from both the punch operating means and the record sheet carrier, and locking them in positions determined by the location of such hole.

4. In a time recorder comprising a record sheet cylinder and clock controlled means for moving the printing mechanism over the record sheet cylinder a predetermined distance longitudinally once each day, the combination with means for printing the time of registering by workmen, a lever adapted to be moved thereby and when so moved to impart longitudinal movement to the record sheet cylinder, a row of punches over the finder control sheet, means connected with and adapted to be moved by the said lever for operating any one of said punches according to the extent of its movement, pins adapted to pass through the punched holes and adapted to arrest the movement of said means, and means operated by said stoppage to disconnect the lever from the said punch operating means and to lock the same and also the record sheet cylinder in a position determined by the location of the hole through which the arresting pin extends.

5. In a time recorder the combination with a record sheet cylinder and printing mechanism, a finder control sheet cylinder, a punch operating means and a row of punches over the same, of means under the control of the machine operating mechanism for imparting movement to the record sheet cylinder and to the punch operating means, means operative to arrest the punching means at points determined by the location of holes which it may have punched, and means controlled by such stoppage adapted to disconnect the movement imparting means from the same and to lock the said means and also the record carrying cylinder.

6. In a time recorder the combination with a record sheet carrier and printing mechanism, a finder control sheet carrier, a punch operating means and a row of punches over said finder control sheet, of a hand device for operating the machine, a pivoted lever connected with and adapted to move the record sheet cylinder longitudinally, a pawl carried by said lever which is engaged by the hand device, a connecting bar from said lever to and adapted to impart movement to the punch operating means, whereby the record sheet cylinder will be moved proportionately to the punch operating means, pins adapted to pass through holes punched in the finder control sheet, and a releasing means carried by the punch operating means for disconnecting the pawl from engagement with the hand device when it encounters a pin projecting through the finder control sheet, and thereby preventing further movement of the record sheet carrier.

7. In a time recorder the combination with a record sheet carrier, a finder control sheet carrier, a row of punches over the finder sheet and a punch operating means movable over the row of punches, a pivoted lever connected with and adapted to impart proportional movement to the record sheet carrier, and to the punch operating means, a lever moved by and during the operation of the registering mechanism, a pawl carried by the first named lever and engaging therewith, and means for disconnecting said pawl therefrom and locking it when the punch operating means has moved to a given position in relation to a previously punched hole.

8. In a time recorder the combination with a record sheet carrier, a finder control sheet carrier, a row of punches over the finder control sheet, spring seated pins projecting from their ends, and a punch operating mechanism movable over the row of punches, a pivoted lever connected with and adapted to impart proportional movement to the record sheet carrier and to the punch operating means, a lever moved by and during the operation of the registering mechanism, a pawl carried by the first named lever and engaging therewith, a pivoted stop carried by the punch operating means and connected with said pawl, and adapted when it encounters a punch pin which has passed through a previously punched hole in the finder control sheet to release the pawl from the moving registering mechanism and lock it in fixed position.

9. In a time recorder the combination with a record sheet carrier, a finder sheet carrier, a row of punches over the same, spring seated pins extending through and projecting from the ends of the punches, and a punch operating means movable over the row of punches, of a handle for operating the registering mechanism of the machine, a shaft partially rotated thereby, a lever loose on said shaft and connected at its opposite ends to the record sheet carrier and to the punch operating means, a pawl carried by said lever, a lever fixed to the partially rotated shaft and engaging through the pawl with said loose lever, a stop pivoted to the punch operating means and connected with said pawl and adapted to encounter and be arrested by a pin which has passed through a punched hole in the finder control sheet and to thereby disengage and lock in fixed position the said pawl.

In testimony whereof we hereunto affix our signatures.

HARRY T. GOSS.
JAMES W. BRYCE.